Dec. 1, 1964   L. A. COURTOX   3,159,417
LITTER
Filed Oct. 18, 1961
2 Sheets-Sheet 1
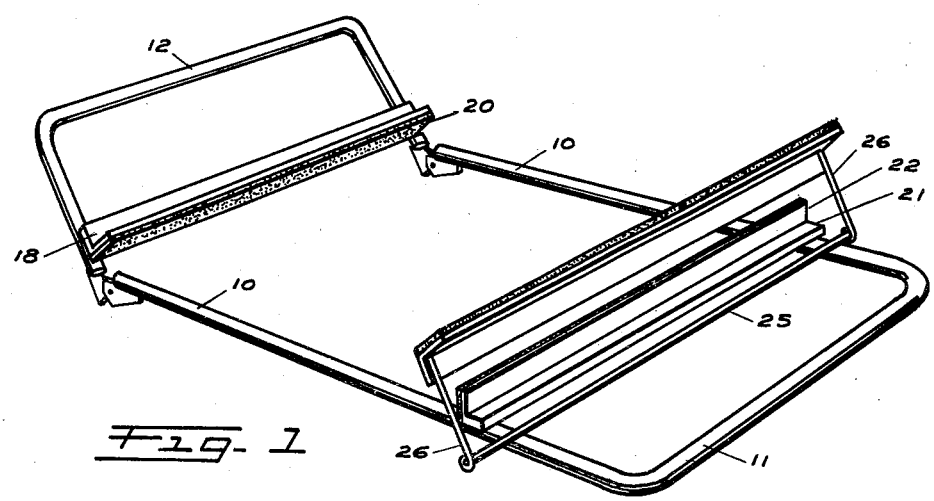
Fig. 1
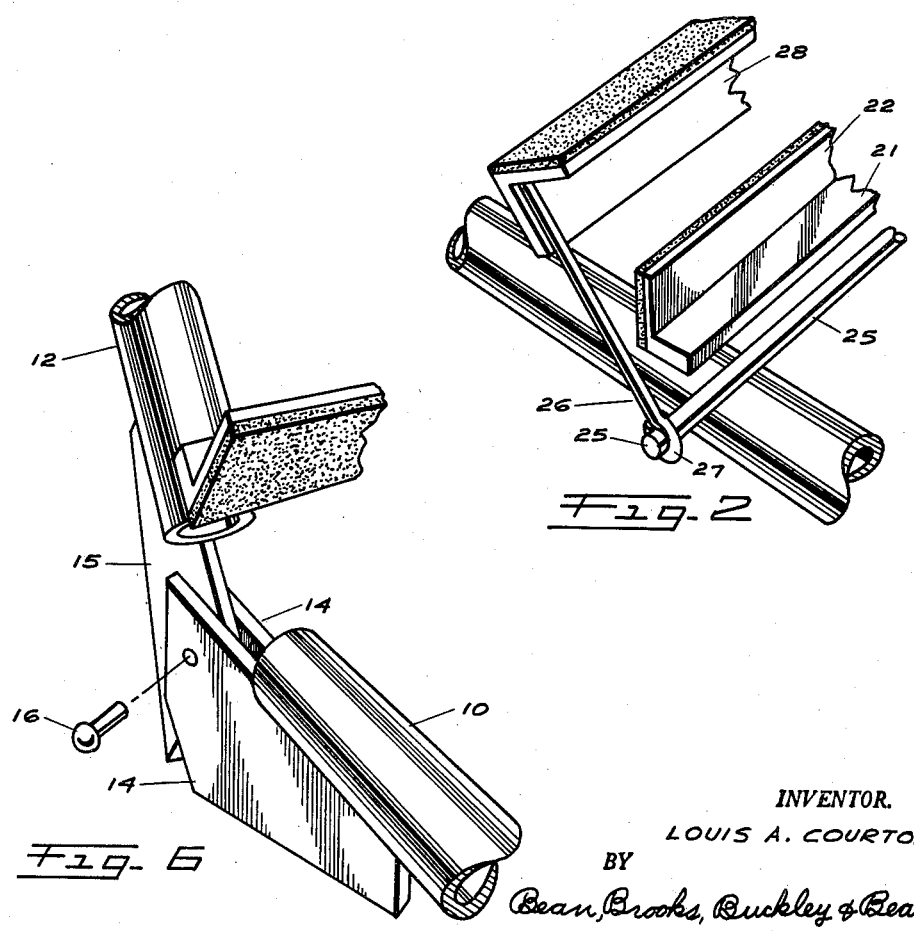
Fig. 2
Fig. 6
INVENTOR.
LOUIS A. COURTOX
BY
Bean, Brooks, Buckley & Bean
ATTORNEYS Dec. 1, 1964 L. A. COURTOX 3,159,417
LITTER
Filed Oct. 18, 1961 2 Sheets-Sheet 2

INVENTOR.
LOUIS A. COURTOX
BY
Bean, Brooks, Buckley & Bean
ATTORNEYS

# United States Patent Office 3,159,417
Patented Dec. 1, 1964

3,159,417
LITTER
Louis A. Courtox, 8 Purdy Ave., Warsaw, N.Y.
Filed Oct. 18, 1961, Ser. No. 146,045
5 Claims. (Cl. 294—16)

The present invention relates to litters or lift frames for lifting and carrying articles from place to place, and particularly adapted to carry behives or sections thereof.

An important phase of the business of a beekeeper today comprises the leasing of bees to proprietors and operators of fruit orchards, in order better to pollenate the flowers of the fruit trees in the orchard thereby to improve the yield of fruit. It thus becomes necessary to provide means for lifting and transporting the beehive from place to place in order to render this vital service.

Beehives are generally of standard rectangular shape and size in construction and are made, generally, in sections, which sections may be assembled one above the other as by nesting an upper section on top of a lower section. The entrance to the hive is normally in the lowest section and a flat top or roof is placed over the uppermost section. In general, the beehive is of relatively standard construction and is either designated as a "single wall hive" or as a "double wall hive."

The present invention provides a lift frame or litter adapted to frictionally embrace the beehive, or a desired section thereof whereby the same may be readily lifted and transported.

The invention also provides a litter which can be collapsed in convenient fashion for easy carriage.

FIG. 1 is a view in perspective of the litter of the present invention; while

FIG. 2 is an enlarged fragmentary view in perspective of embracing and gripping members of the litter.

FIG. 6 is an enlarged fragmentary view of a hinge of the litter.

Referring more particularly to the drawings, wherein identical numbers identify identical parts in each of the several views, the litter is former of longitudinally extending parallel side frames 10 made of any suitable composition, as for instance tubular metal stock. The side frames are connected at one end with a laterally extending connection member 11 serving as a handle for the litter. A companion handle 12 is connected to the other end of the longitudinal frame members 10 in a manner permitting movement of that handle through more than at least 180° of arc whereby the handle may be assembled against the longitudinal frame members 10 thereby materially to shorten the overall length of the litter and provide an assemblage which, in its compact form, may be readily carried, handled and stored in the trunk compartment of the normal family automobile, or readily carried in a pick-up truck.

Figure 5:
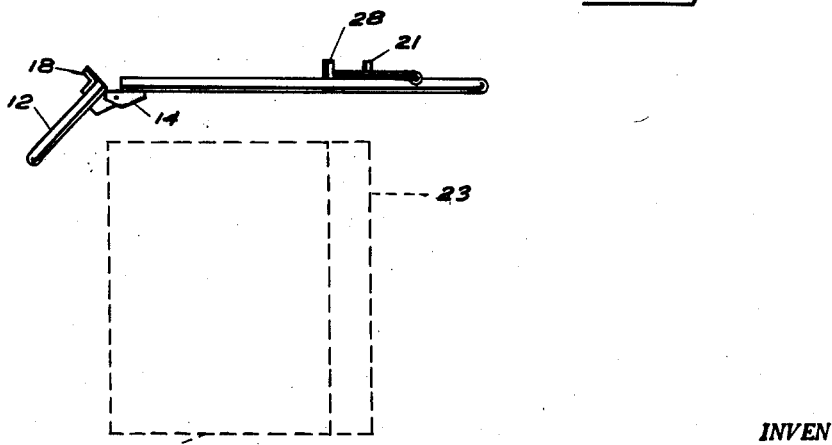

As shown particularly in FIG. 6, a hinge plate 14 is attached to the underside of each of the longitudinal members 10 comprising the carrier frame, while a cooperating hinge plate or section 15 is attached to the underside of the handle portions which attach to the frame member 10. These hinge plates are assembled in any conventional manner as by use of a hinge pin. As shown in the drawing, the hinge permits the movement of handle 12 through an arc of more than 180° and permits the handle to be assembled upon the under side of the carrier frame members 10. This movement may be seen in FIG. 5.

Adjacent the ends of handle member 12 there is provided a laterally extending brace and gripping member 18 attached in any convenient manner, as by welding to the side of handles 12, the purpose of which is to bear against one side of the article being carried in the litter, as for instance a beehive.

As specifically shown in the drawings, this member comprises an angle iron, one leg of which is attached to the upper side of members 12, while the other leg of the angle extends at a right angle to the attached leg as shown in FIG. 1.

In order that the gripping and snubbing action of the angle iron may be more positive and secure, the upwardly extending leg of the angle iron may be provided with means 20 on the face thereof to minimize slipping when the article to be carried is assembled in carrying relation with the litter. Thus the face may be roughened and knurled or, as shown in the drawing, a pad 20 of an elastomer, such as rubber, may be cemented to the vertical leg of the angle iron.

A companion parallel angle member 21, spaced a distance from angle iron 18 equivalent to the width of a double wall hive is, like angle 18, connected to the longitudinally extending frame members 10 and the vertically extending leg 22 of that angle may similarly be provided with means for reducing slippage between the hive and the angles when the hive is embraced for carriage.

Figure 4:
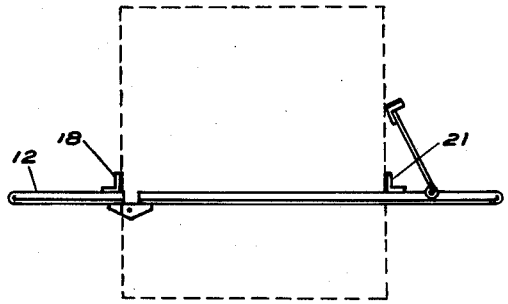

In operation, therefore, the carrying frame or litter is lowered over and around a double well hive, as shown in the dotted outline at 23 to the position shown in FIG. 4. When the frame is grasped by handle members 11 and 12, the hinged or pivotal mounting 14 permits upward movement of handle 12 and imposition of pressure by member 18 against a side of the hive thereby pushing the hive against angle 21 and providing a secure means for carrying the hive. When the hive is placed upon a desired pedestal, handle 12 may then be lowered thus releasing the hive and by grasping the longitudinal members 10 the litter may be moved upwardly without disturbing the hive in its new position.

In order to provide for carriage of single wall hives shown in outline at 24, a pivot pin 25 is attached to the upper portions of carrier frames 10, which pivot pin is substantially parallel to angle 20. At each end of pivot pin 25 which, as shown, extends slightly beyond each of carrier frames 10, an arm 26, provided at one end with a ring 27, as shown in FIG. 2, embraces pivot pin 25 for pivotal movement thereabout. The other end of each of arms 26 is attached to a member adapted for exerting pressure against a single wall hive and, as shown, that member comprises an angle iron 28 having provided upon the vertical face thereof frictional means 20, as for instance, a rubber facing pad in a manner similar to angle member 18.

Figure 3:
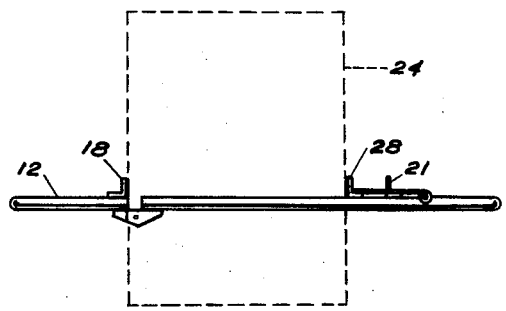
FIGS. 3, 4 and 5 show the litter in use with a beehive shown in phantom.

Whereas arm 23 is raised and merely rests against the side of a double wall hive, as shown in FIG. 4, when carrying a single wall hive the arm is lowered as shown in FIG. 3 and provides the necessary and desired frictional engagement so that the single wall hive may, with the same litter, be carried and transported as described above in connection with the double wall hive.

What is claimed is:

1. A litter comprising a first pair of substantially parallel longitudinally extending frame members spaced apart laterally a distance sufficient to embrace a beehive therebetween, said members being connected integrally at one end to form a handle, the other end of each of said members being attached through a pivot to a second pair of longitudinally extending members integrally connected together at their ends which are opposite the pivot to form a second handle, said second handle being movable about the pivot through at least a 180° arc, and one lateral member rigidly connected to and extending between each pair of said longitudinally extending members and spaced a distance apart sufficient to grip and hold a beehive.

2. The litter of claim 1 provided with an additional lateral member pivoted to one pair of longitudinally extending members so that it may be movable to a position between and parallel to said two rigidly connected lateral members.

3. The litter of claim 1 wherein the lateral gripping members are the vertical legs of angle irons.

4. The litter of claim 3 wherein the vertical legs of the angle irons are provided with a facing of an elastomer.

5. The litter of claim 1 wherein the second handle member is movable about the pivot attachment to nest adjacent the first pair of frame members.

References Cited in the file of this patent

UNITED STATES PATENTS

| | | |
|---|---|---|
| 2,218,845 | Kiggans | Oct. 22, 1940 |
| 2,457,646 | Dalferes | Dec. 28, 1948 |

FOREIGN PATENTS

| | | |
|---|---|---|
| 45,774 | Sweden | of 1917 |
| 132,805 | Sweden | of 1951 |